Figure 1:
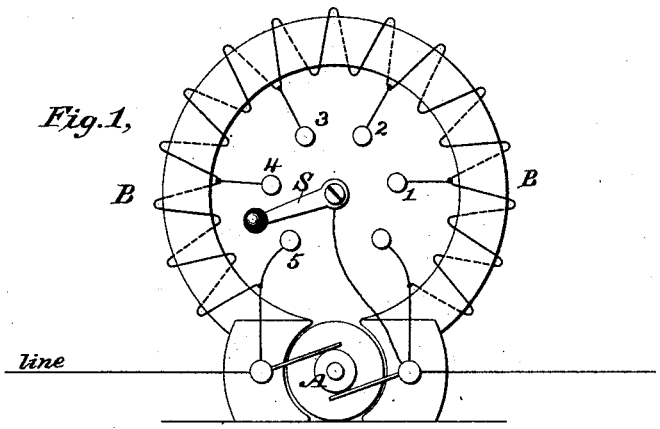

(No Model.) 2 Sheets—Sheet 1.

S. S. WHEELER.
REGULATION OF ELECTRIC MOTORS.

No. 370,000. Patented Sept. 13, 1887.

Witnesses
Geo. W. Breck.
Chas. J. Maguire.

Inventor
S. S. Wheeler
By his Attorneys
Curtis & Crocker (No Model.) 2 Sheets—Sheet 2.

S. S. WHEELER.
REGULATION OF ELECTRIC MOTORS.

No. 370,000. Patented Sept. 13, 1887.

# UNITED STATES PATENT OFFICE.

SCHUYLER S. WHEELER, OF NEW YORK, N. Y., ASSIGNOR TO THE C & C ELECTRIC MOTOR COMPANY, OF SAME PLACE.

REGULATION OF ELECTRIC MOTORS.

SPECIFICATION forming part of Letters Patent No. 370,000, dated September 13, 1887.

Application filed March 12, 1887. Serial No. 230,613. (No model.)

To all whom it may concern:

Be it known that I, SCHUYLER S. WHEELER, of the city, county, and State of New York, have invented certain Improvements in Electric Motors, of which the following is a specification.

My invention is especially applicable to cases where electric motors are run on "series" circuits—that is, where other motors or other converting devices are operated in series on the same circuit, and on which, therefore, there is required continually a practically constant current; and the main object of this invention is to provide practicable and convenient means whereby the power or speed of the motor, or both, may be varied and nicely regulated at will, and to accomplish this in such a way that the loss of electric energy shall be reduced to a minimum.

Heretofore the ordinary way of controlling the power and speed of electric motors in series circuits, such as the ordinary "arc-light" circuits, has been to connect in multiple arc with them a "shunt" or variable resistance which can be made to short-circuit the motor to a greater or less extent, according to the power required, the effect being to vary the electro-motive force between the terminals of the machine; but this method is open to several serious objections, which for some purposes render it entirely impracticable. It requires a special shunt or resistance-box, which must be capable of carrying without dangerous heating the full current passing through the circuit, and must have a large amount of resistance to enable it to be used with large motors. This necessitates a very bulky and expensive apparatus in addition to the motor itself, which in many instances it is difficult to find room for, and which is otherwise objectionable.

In most cases where motors are run in series with other motors or lights on the same circuit it is unsafe or undesirable to pass the whole current through the motor and to rely upon its armature and brushes to carry the current which also feeds the other motors, and therefore it is necessary, or very preferable, to make use of a shunt or short circuit around the motor, which not only enables the current through the motor to be controlled, but furnishes a permanently-connected path for carrying the current for the other motors or lights in case the motor-circuit becomes broken or interfered with in any way. Unless such a shunt is made of so high a resistance as to throw a very large proportion of the total current through the motor, and the motor is kept running at its full power, a considerable and perhaps a large portion of the current will be an absolute loss; besides which it is open to the objection that the entire current cannot be passed through the motor so as to produce the maximum power.

By my invention I am enabled to accomplish the regulation of the motor without the use of any special shunt or regulating apparatus external to the motor, and to avoid the use of any ineffective or "dead" resistance in circuit, and therefore to avoid the considerable loss of current necessarily resulting from such dead resistance. I am also enabled to obtain other advantages which may be desirable under certain conditions.

My invention is represented in the accompanying drawings, in which—

Figure 2:
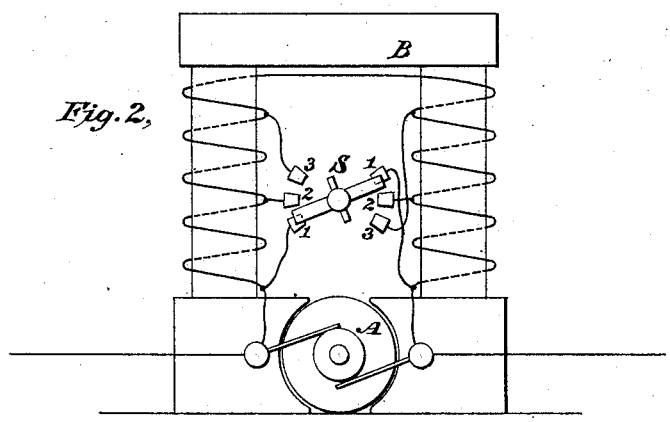

Figure 1 shows a diagram of my improved motor provided with my improved regulating apparatus in its simplest form. Fig. 2 shows my invention with a modified form of field-winding; and Figs. 3, 4, and 5, respectively, show other modifications of my invention.

In Fig. 1, A represents the armature of the motor, which is connected in the line, as shown, so that the entire current can be made to pass through it. B represents the field-magnet of the machine. This I wind in sections, or with a number of conductors or wires in various ways, and of the proper relative resistances with respect to that of the armature, so that the resistance of the field-coils can be increased or diminished, as required. In Fig. 1 this form of field-winding is shown as consisting of a continuous winding, having the proper number of turns and proper resistance and divided up into a number of sections in series. This field-winding I connect permanently in multiple arc with the armature, and the respective ends of each section are brought out and connected, respectively, to the points of a switch, S, the arm of which switch is connected with the line on one side of the machine, as shown. The resistance of the entire field-winding is so proportioned to the resistance and normal counter electro-motive force of the armature that when the armature is running at normal speed only a sufficient portion of the entire current passes through the field-magnet coils to feed it properly—say, from five to ten per cent—the rest of the current passing through the armature, so that there is no unnecessary loss in the field-coils, and the maximum efficiency possible is obtained. Consequently, when the switch S is open, as shown, for example, the motor is running under these conditions, and is giving its maximum power. To reduce the power or speed slightly, the switch is turned so as to connect with the contact-point $l$, for example. This cuts out or short-circuits one of the field-coil sections, and reduces the resistance of the field-coils to that extent. The effect of this is that less of the current passes through the armature and a correspondingly greater amount passes through the field-coils, the total current being by hypothesis constant, so that the power of the motor is slightly reduced. Although under these conditions more current passes through the field-coils, yet it passes through fewer sections or turns, and therefore through correspondingly less resistance, so that the amount of electric energy lost in the field-coils is not thereby increased, but remains practically the same. To reduce the power still further, the switch is turned so as to connect with the second, third, or fourth contact-point, and so on, as desired, according to the amount of reduction required, the field-coil resistance being thereby reduced more and more, so that less current passes through the armature and more and more through the field-coils, thus enabling the power of the machine to be reduced to any desired extent. To stop the machine or cut its armature out of circuit, the switch is set on a final point, 5, which completely short-circuits both the field-magnet coils and the armature, so that the machine has then no resistance in the circuit. It will be seen that with this method of governing the power of the motor there is never any dead resistance in circuit—that is, there is never any wire in circuit the current in which is not performing some useful function, either in magnetizing the field-magnet coils or feeding the armature, and consequently the loss is reduced to the minimum. By properly proportioning the different resistances of the field-sections the amount of current which passes through the field-coils will be only sufficient, or thereabout, to magnetize it the proper amount, all the rest of the current passing through the armature, so that under all conditions of power a high efficiency can be obtained.

The motor may be required to run under a constant speed and varying load; or it may be required to run under a constant load and varying speed. In the first case, as the motor is started, and more and more of the field-sections cut into circuit, the less current passes through the field-coils, and consequently these sections can be made of smaller wire in proportion as more of them become cut into the circuit. When only the first section is in circuit, perhaps one half or three-quarters of the entire current will be carried by it, whereas when more sections are cut into the circuit the field-magnet's current will become only one-quarter or perhaps ten per cent. or less of the total current. If the motor is run under a constant load, or constant pull at varying speed, the current strength in the armature will have to be kept nearly the same, so that while the field-magnet resistance is varied the current strength in the field-coils will remain practically the same, and consequently under such conditions all the sections of the field-coils must have the same current capacity, and they cannot be made of different sizes of wire, as in the first case. If the motor is run under conditions which require a varying load and varying speed both, as is often the case, the field-winding can be arranged accordingly.

In Fig. 2 I have shown a modification of my invention, in which the field-winding is divided up into a number of sections in series, as shown; but the controlling-switch is arranged so as to vary the number of sections in circuit symmetrically with respect to both legs of the field-magnet. The switch in this arrangement is a double switch, having two sets of contact-points. When the switch is set on the first points—1 1, for example— both the armature and field-coils are dead short-circuited, the current passing across through the two arms of the switch, which may of course be constructed so that its resistance amounts to nothing, and therefore no current passes through the field-coils. When the switch is turned, so as to connect with the next set of contact-points, 2 2, it introduces into the field-circuit two sections, one on each leg or pole of the field-magnets, so that the field is electrically balanced, as will be seen at once from the drawings. When the switch is turned farther, so as to connect with the points 3 3, two more symmetrical sections of the field are introduced into the circuit, and so on, other points of the switch being connected in the same way, so as to enable any desired number of sections to be connected in circuit symmetrically. In this way more or less of the field-coils may be short-circuited and the resistance of the field-magnet thereby varied, thus enabling the strength of current in the armature to be controlled, and at the same time the field will be properly regulated in relation to the armature, the total current in circuit being constant, in accordance with my invention.

Figure 3:
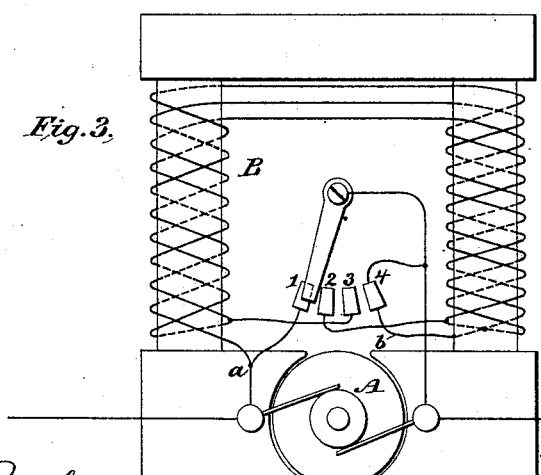

In Fig. 3 I have shown another symmetrical arrangement, in which the separate sections of the field-coils are wound on in layers connected in series. The terminals of the field A and B are permanently connected with the armature terminals, and the terminals of each section are connected to a series of contact-points, 1 2 3 4, &c., of a switch, the arm of which is connected with one of the armature terminals, as clearly shown. When the switch is on point 1, both the armature and the field-magnets are dead short-circuited, the current passing only through the switch, as shown. By setting the switch on point 2 the current is compelled to pass through one layer on one leg of the field-magnet, and then through a corresponding layer on the other leg of the field-magnet to the point 2, so that this much of the field-winding is introduced into the circuit. If the switch be set on the point 3, the current is made to pass through the first layer, as before, and back through the second layer to the point 3, thus introducing two layers or sections into the circuit. If the switch be set on point 4, the current is compelled to pass through the first layer and then back through the second layer, as before, and then back through the layer to the point B, thus introducing three sections into the circuit. In the same way any desired number of sections may be wound upon the field-magnet and connected with a suitable switch, so as to enable more or less of them to be short-circuited, according to my invention.

Figure 4:
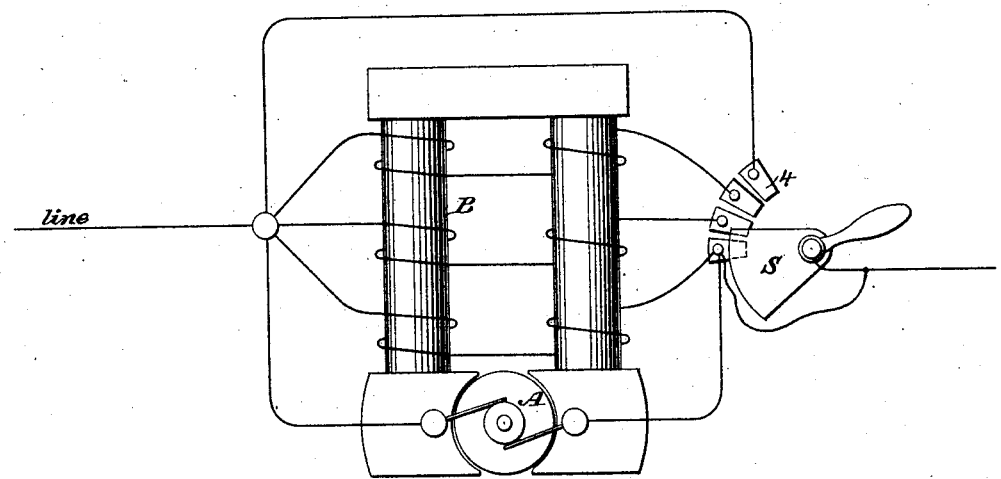

In Fig. 4 I have shown still another modification of my invention. In this construction the field is composed of a number of different sections, as before; but these are arranged so that more or less of the sections may be connected together in multiple arc, these sections being all connected together at one end and separately connected at the other to a switch, S, whereby more or less of them may be connected to the circuit or to the terminals of the armature in multiple arc. I construct this switch so that after all the field-sections have been introduced into the circuit a further movement of the switch will make connection with a fourth contact-point, 4, which is directly connected with the other terminal of the machine, and forms a dead short circuit to both field-magnet and armature. Consequently, by turning the switch S, more and more of the field-sections become cut into circuit in multiple arc, and the field-magnet resistance and the power of the motor thereby reduced, until finally, when the switch reaches the last point, both the armature and the field-magnet become short-circuited, and no current passes through the motor.

Figure 5:
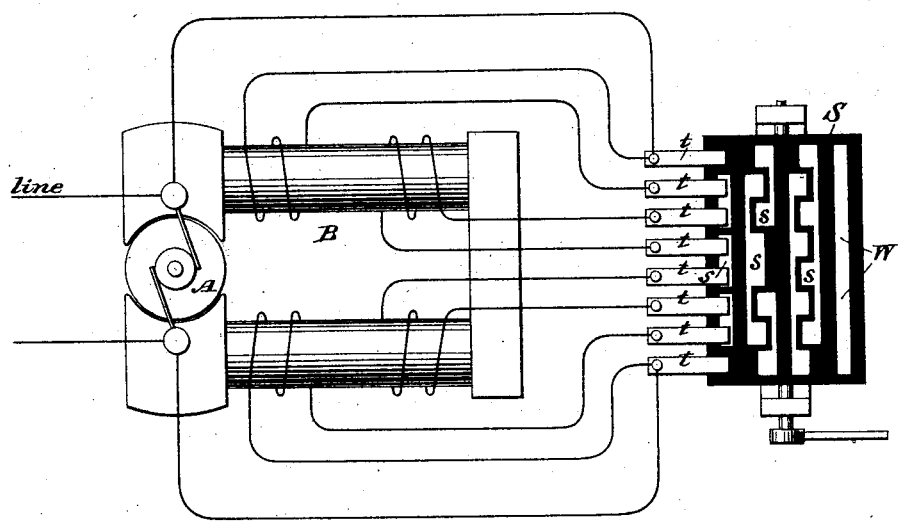

In Fig. 5 I have shown another modification of my invention, in which the field-magnet resistance may be varied by connecting the several sections of which it is composed in circuit, either in series or in groups, or in multiple arc, in the way described in Letters Patent to Wheeler, Curtis and Crocker, No. 271,175 of January 23, 1883. This is accomplished by means of a circuit-controlling switch, S, which I have shown made in the form of a drum, of insulating material, with metal connecting-strips $s\ s\ s$ mounted on its surface, and arranged so that by bringing different strips successively under a series of contact-springs, $t\ t\ t$, &c., different combinations of the field-sections in series, in groups, or in multiple-arc may be made, and the desired variation in the field-magnet resistance thereby produced. The switch S is also provided with a connecting-strip, W, which can be brought under the two extreme contact-springs $t\ t$, which are respectively connected directly with the armature terminals, so that after all the field-magnet circuits have been grouped in multiple arc, and the resistance of the field thereby reduced as far as possible, a further movement of the switch will bring the strip W into operation and dead short-circuit both the field-magnet and the armature.

My invention is particularly applicable to and useful for controlling the power or speed of electric motors.

My invention not only entirely dispenses with the necessity of any shunt or extra apparatus requiring space or requiring special connections in addition to the motor, and enables the motor to be run at different speeds or powers in such a way that the loss of current involved by the ordinary method is avoided, but it enables the motor to be temporarily overworked, so as to develop more power for a short time when needed. This can be done by having a reserve section or extra winding on the field-magnet which has a considerable resistance, and is capable of carrying a sufficient current to magnetize the field-magnet above its normal point for a short time. This extra field-winding may be used either alone or in series with the normal field-winding, and by throwing it on, the resistance of the field-magnet will be largely increased, and at the same time the number of turns on the field-magnet will be increased. This tends to throw more current through the armature, and by then allowing the speed of the armature to increase, so that it generates a higher counter electro-motive force, the amount of electrical energy supplied to both the armature and the field-magnet will be augmented, and the power of the motor is thereby increased.

Another advantage of my invention is that it prevents the entire current being passed through and the armature relied on to carry the current in case the machine is used without any shunt, because it provides a shunt to the armature in the motor itself, so that it is impossible to connect the motor and pass the entire current through the armature. It also makes it impossible to connect the motor up so that it can race or run away by neglect to put on a shunt.

What I claim as my invention, and desire to secure by Letters Patent, is—

1. The combination, with an electric motor having its field-magnet winding electrically divided into a number of sections in series and the entire series connected in multiple arc to the armature, of circuit-controlling devices for increasing or reducing the number of such sections through which the current passes.

2. The combination, with an electric motor having its field-magnet winding electrically divided into a number of sections in series and connected in multiple arc to the armature, of circuit-controlling devices for increasing or reducing the number of such sections through which the current passes successively from the entire winding to a short circuit.

3. The combination, with an electric motor having its field-magnet winding electrically divided into a number of sections in series and connected in multiple arc to the armature, of circuit-controlling devices for short-circuiting more or less of such field-sections, as desired, and thereby varying the resistance of the field coils.

4. The combination, with an electric motor having the coils upon each leg of its field-magnet electrically divided into a number of corresponding sections in series and connected in multiple arc with the armature, of circuit-controlling devices for short-circuiting corresponding sections upon each leg of the field at the same time.

5. The combination, with an electric motor having its field-magnet winding electrically divided into a number of sections and connected in multiple arc with the armature, of circuit-controlling devices for connecting such sections in different combinations or groups, so as to vary the field-magnet resistance, and circuit-controlling devices for short-circuiting both the field-magnet and armature.

6. The combination, with an electric motor having its field-magnet connected in multiple arc with the armature, of a circuit-controlling switch arranged to vary the resistance of the field-magnet, and also to short-circuit both the armature and the field-magnet when set in a certain position.

SCHUYLER S. WHEELER.

Witnesses:
 CHAS. G. CURTIS,
 CHAS. J. MAGUIRE.